United States Patent [19]
Saxena et al.

[11] Patent Number: 5,912,678
[45] Date of Patent: Jun. 15, 1999

[54] PROCESS FLOW DESIGN AT THE MODULE EFFECTS LEVEL THROUGH THE USE OF ACCEPTABILITY REGIONS

[75] Inventors: Sharad Saxena, Dallas; Amy J. Unruh, Austin; Purnendu K. Mozumder, Plano; Richard G. Burch, McKinney, all of Tex.

[73] Assignee: Texas Instruments Incorporated, Dallas, Tex.

[21] Appl. No.: 08/839,522

[22] Filed: Apr. 14, 1997

[51] Int. Cl.[6] .................................................... G06F 19/00
[52] U.S. Cl. ................... 346/468.09; 346/468.02; 346/468.28; 346/140.01
[58] Field of Search ..................... 364/468.03, 468.01, 364/468.02, 468.28, 140.01

[56] References Cited

U.S. PATENT DOCUMENTS

| | | | |
|---|---|---|---|
| 5,552,996 | 9/1996 | Hoffman et al. | 364/468.28 |
| 5,598,344 | 1/1997 | Dangelo et al. | 364/489 |

OTHER PUBLICATIONS

Leang, et al., "A Control System for Photolithographic Sequences", *IEEE Transactions on Semiconductor Manufacturing*, vol. 9, No. 2, May 1996, pp. 191–207.

Saxena, et al., "A Methodology for the Top–Down Synthesis of Semiconductor Process Flows", *IEEE International Symposium on Semiconductor Manufacturing* (1995), pp. 36–40.

Klein, "A Structured Methodology for IC Photolithography Synthesis in Semiconductor Manufacturing", *IEEE Transactions on Semiconductor Manufacturing*, vol. 1, No. 1, Feb. 1988, pp. 28–35.

*Primary Examiner*—Albert DeCady
*Assistant Examiner*—Esaw Abraham
*Attorney, Agent, or Firm*—Bret J. Petersen; Richard L. Donaldson

[57] ABSTRACT

Methods and processes to reduce the cost and cycle time of designing manufacturing flows are described, particularly for microelectronic integrated circuit processes. One embodiment of the present invention is a method which divides the task of designing process flows into a number of abstraction levels and provides mechanisms to translate between these levels of abstraction. The process is divided into a number of modules each having process constraints. Process constraints are propagated backwards from the final module to the first module, and may also be propagated forward from earlier modules to later modules of needed. This approach results in a top-down design methodology where requirements from higher levels of abstraction are successively reduced to lower abstraction levels, while meeting the constraints imposed by the lower levels.

13 Claims, 8 Drawing Sheets

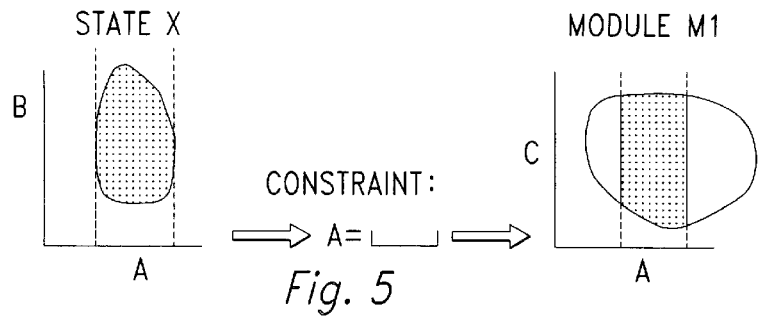

Fig. 5

| | | | |
|---|---|---|---|
| DESIGN | DESIGNABLE | OPTIMIZE | OPTIONS | EXIT |

INTEGRATED DESIGN ENVIRONMENT
DEVICE VIEW

DEVICE DESIGNABLES

| | | | |
|---|---|---|---|
| Tox | FIXED AT NOMINAL VALUE | NORMAL | 90 |
| Ptsali | FIXED AT NOMINAL VALUE | NORMAL | 1100 |
| NW | FIXED AT NOMINAL VALUE | NORMAL | 2.5 |
| Nvtdpeak | FIXED AT NOMINAL VALUE | NORMAL | 0.0625 |
| Nresali | FIXED AT NOMINAL VALUE | NORMAL | 0.075 |
| Nvtchar | FIXED AT NOMINAL VALUE | NORMAL | 0.06 |
| PW | FIXED AT NOMINAL VALUE | NORMAL | 5 |
| Presali | FIXED AT NOMINAL VALUE | NORMAL | 500 |
| Pxyratio | FIXED AT NOMINAL VALUE | NORMAL | 0.6 |
| Pvtchar | FIXED AT NOMINAL VALUE | NORMAL | 0.08 |
| Lac | FIXED AT NOMINAL VALUE | NORMAL | 2.5 |
| Lcap | FIXED AT NOMINAL VALUE | NORMAL | 0.03 |
| hPa | FIXED AT NOMINAL VALUE | NORMAL | 18.6 |
| hBa | FIXED AT NOMINAL VALUE | NORMAL | 19.27 |
| hBb | FIXED AT NOMINAL VALUE | NORMAL | 27.29 |
| hAk | FIXED AT NOMINAL VALUE | NORMAL | 20.46 |
| L | FIXED AT NOMINAL VALUE | NORMAL | 0.5 |
| hBc | FIXED AT NOMINAL VALUE | NORMAL | -260 |
| IPa | FIXED AT NOMINAL VALUE | NORMAL | 19.25 |
| vdd | FIXED AT NOMINAL VALUE | NORMAL | 3.3 |
| hBd | FIXED AT NOMINAL VALUE | NORMAL | 666 |
| IPd | FIXED AT NOMINAL VALUE | NORMAL | -11.5 |
| Lsw | FIXED AT NOMINAL VALUE | NORMAL | 0.1 |

CALCULAATE PERFORMANCES

Fig. 6b

| EDIT DEVICE PERFORMANCE | |
|---|---|
| DEVICE PERFORMANCE NAME : FOM1 | |
| SET THE PERFORMANCE TYPE. | |
| ▽ ACTIVE : PERFORMANCE IS CONTTRAINED DURING DECOMPOSITION. | |
| ∨ INACTIVE: PERFORMANCE IS UNCONTRUCTED DURING DECOMPOSITION | |
| NOMINAL VALUE :0 HZ | |
| INTERVALS          MIN      MAX | |
| CONSTRAINT VALUES  2.6e+09  1.3e+10  HZ | |
| ACCEPT | CANCEL |

*Fig. 6c*

| DEVICE PERFORMANCES ||||||
|---|---|---|---|---|---|
| | SYNTHESIS || ANALYSIS |||
| PERFORMANCE | MIN | MAX | NOMINAL | DESIGN PT. | UNITS |
| PDIoff | 1.8e-14 | 1.8e-14 | 0 | 0 | AMPERES |
| NVTlin | NO CONSTRAINT || 0 | 0 | VOLTS |
| NdelVT | NO CONSTRAINT || 0 | 0 | VOLTS |
| PVTlin | NO CONSTRAINT || 0 | 0 | VOLTS |
| NIdlin | NO CONSTRAINT || 0 | 0 | AMPERES |
| PdelVT | NO CONSTRAINT || 0 | 0 | VOLTS |
| NVTsat | NO CONSTRAINT || 0 | 0 | VOLTS |
| PIdlin | NO CONSTRAINT || 0 | 0 | AMPERES |
| NIdrive | NO CONSTRAINT || 0 | 0 | AMPERES |
| NFOM1 | NO CONSTRAINT || 0 | 0 | HZ |
| PVTsat | NO CONSTRAINT || 0 | 0 | VOLTS |
| FOM1 | 2.6e+09 | 1.3e+10 | 0 | 0 | HZ |
| PIdrive | NO CONSTRAINT || 0 | 0 | AMPERES |
| PFOM1 | NO CONSTRAINT || 0 | 0 | HZ |
| NDIOFF | 1.9e-14 | 4.6e-10 | 0 | 0 | AMPERES |

*Fig. 6a*

```
┌─ EDIT DEVICE PERFORMANCE                           ○ □
│ DEVICE PERFORMANCE NAME :Tox
│    SET THE DESIGNABLE TYPE.
│  ┌─────────────────────────────────────────────┐
│  │ ▽ VARIABLE:DESIGNABLE CAN BE CHANGED & CONSTRAINED. │
│  ├─────────────────────────────────────────────┤
│  │ ∨ FIXED    :DESIGNABLE WILL REMAIN AT SPECIFIED DESIGN POINT │
│  ├─────────────────────────────────────────────┤
│  │ ∨ NOMINAL:DESIGNABLE WILL REMAIN AT NOMINAL VALUE │
│  └─────────────────────────────────────────────┘
│ NOMINAL VALUE : 90 A
│ ┌─────────────────────────────────┐
│ │ INTERVALS        MIN      MAX    │
│ │ MODEL LIMITS     65       105    A │
│ │ CONSTRAINT VALUES│65│    │105│   A │
│ │ DESIGN POINT          │90│      A │
│ └─────────────────────────────────┘
│  ┌──────ACCEPT──────┐       ┌──────CANCEL──────┐
```

*Fig. 6d*

| Pvtpeak | FIXED AT NOMINAL VALUE | | | | | NOMINAL | 0.11 |
|---------|------------------------|---|---|---|---|---------|------|
| PVTPEAK CM^-3 | CONSTRAINT | MIN | 1e+17 | MAX | 1e+18 | DESIGN PT | 4.5e+17 |
| | FIXED AT DESIGN POINT | | | | | NOMINAL | 4.5e+17 |
| Tox (A) | CONSTRAINT | MIN | 65 | MAX | 105 | DESIGN PT | 90 |
| | REGION | MIN | 90 | MAX | 90 | NOMINAL | 90 |

PROCESS FLOW DESIGN AT THE MODULE EFFECTS LEVEL THROUGH THE USE OF ACCEPTABILITY REGIONS

CROSS-REFERENCE TO RELATED APPLICATIONS

The following coassigned patent applications are incorporated herein by reference:

| Number | Filing Date | Title |
| --- | --- | --- |
| 5,408,405 | 09/20/93 | Multi-Variable Statistical Process Controller for Discrete Manufacturing |
| 08/201,302 | 02/24/94 | Use of Spatial Models for Simultaneous control of Non-Uniformity Metrics |
| 5,402,367 | 07/19/93 | Apparatus and Method for Model Based Process Control |
| 60/004,224 | 09/25/95 | Controlling Process Modules Using Site Models and Monitor Wafer Control |

FIELD OF THE INVENTION

This invention generally relates to the design of multiple module process flows. More particularly, it relates to a top-down approach to designing microelectronic manufacturing process flows by translating device performance requirements to the treatments/settings required from the various process modules using acceptability regions developed for the process modules. The preferred embodiments are directed to semiconductor process flows.

BACKGROUND OF THE INVENTION

Progress in microelectronics has been possible in a large part due to improvements in the microelectronics manufacturing technology. Unfortunately, continued advances in microelectronic manufacturing require substantial investments of capital and time to develop the increasingly complex technology. This increase in the cost of technology development threatens to slow the growth rate of electronic technology and the electronics industry.

Manufacturing of integrated circuits starts with a thin slice of ultra-pure silicon crystal, called a silicon wafer, and proceeds by a sequence of precisely controlled fabrication steps performed on the wafer. The specification of the sequence of steps, along with the precise operation to be performed at each step is known as a process flow. The task of designing a process flow to produce the desired electronic devices can be divided into two parts. The first part is to design process modules that can result in the desired set of changes in the wafer-state. This part is called module synthesis. The second part involves assembling the process modules into a process flow by selecting a sequence of modules and the exact wafer-state transformation performed by each module, such that the end of flow wafer-state results in the desired devices. This second part is called herein flow synthesis.

SUMMARY OF THE INVENTION

In accordance with the present invention, an improved method is provided for flow synthesis to reduce the cost and cycle time for developing microelectronic manufacturing technologies. The invention describes assembling process flows from reusable subsequences called process modules.

One embodiment of the present invention is a method which divides the task of designing process flows into a number of abstraction levels and provides mechanisms to translate between these levels of abstraction. This results in a top-down design methodology where performance goals from a higher level of abstraction are successively reduced to goals at the lower level, while satisfying constraints imposed by the lower level. This is in contrast to a bottom-up design methodology often followed in process design. In the bottom-up approach, one first makes process changes and then evaluates their impact on the device performance. This approach of partitioning a complex problem into a number of abstraction levels is motivated by similar approaches that have been successful in reducing the design cost and cycle-time in circuit synthesis An advantage of the present invention is reduced cycle time for design of new processes, particularly of semiconductor manufacturing processes.

An additional advantage of the present invention, is the visualization capability when the existing modules are unable to produce the desired device. In these situations, by viewing the acceptability regions at different stages of propagation, the designer can identify candidate modules that need to have expanded capability, or the device performances that need to be relaxed in order to be able to use the current modules.

Another advantage of an embodiment of the present invention is grid and hierarchical representation of acceptability regions to reduce the computational resources required to perform the propagation of constraints on a computer system.

BRIEF DESCRIPTION OF THE DRAWINGS

The novel features of the invention are set forth in the appended claims. The invention itself, however, as well as other features and advantages thereof, will be best understood by reference to the detailed description which follows, read in conjunction with the accompanying drawings, wherein:

FIG. 5 shows an example where wafer state constraints and module constraints have different dimensionality; and FIG. 6a–h illustrates screen displays for a computer program embodiment of the present invention.

DETAILED DESCRIPTION OF THE PREFERRED EMBODIMENTS

Abstraction Levels and Modules

Figure 1A:
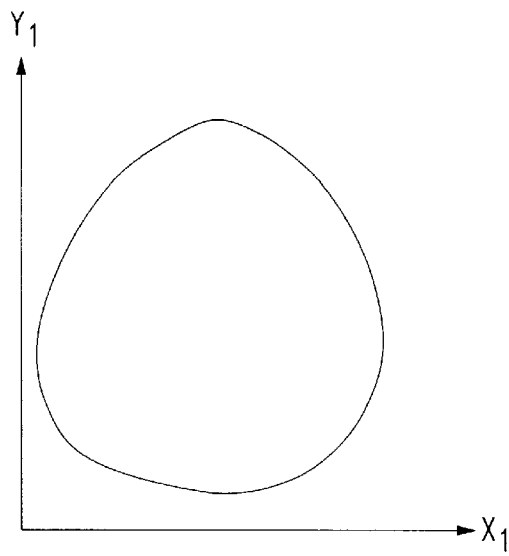
FIG. 1a, b shows an acceptability region and a gridded acceptability region for variables x and y.

An important aspect of the methodology of the present invention is to partition the task process flow design into a number of abstraction levels, and provide mechanisms to translate design requirements between the abstraction levels. This approach of dividing a complex problem into a number of levels, and defining precise interfaces between these levels, is motivated by similar approaches that have been successful in digital circuit synthesis and the design of computer networks. Table 1 shows the abstraction levels identified for process flow synthesis.

TABLE 1

Device Performance
Device Designables
Module Effects
Module Treatments
Module Settings The highest level of abstraction is the device performance level. The device requirements are specified at this level. Typical examples of performance requirements for integrated circuits are the drive current of the transistor ($I_{on}$), the maximum allowable leakage current ($I_{off}$), a figure of merit that measures the switching speed of the transistor (FOM), reliability requirements, etc. These requirements are derived from circuit performance considerations and customer needs. They provide a set of targets and constraints for the devices produced by the process flow.

The next level of abstraction is the level of device designables. These are the features of the semiconductor device that a designer can modify to obtain the device performance. Examples of device designables for a MOSFET, a family of semiconductor devices most commonly found in modern integrated circuits, include: effective length of the gate electrode used to switch the transistor ($L_{eff}$), thickness of the gate oxide ($T_{ox}$), doping profiles describing the various impurities used to control the characteristics of the transistor, etc. An important aspect of this novel approach to device designables is that they are defined independent of the process that will achieve the desired values of the designables. This provides a clear separation between device design and process design.

The next three abstraction levels are concerned with the notion of process modules. Module effects are the changes on the wafer that are observed as a result of module processing. Examples include oxide thickness, gate length, etc. Module treatments is the environment to which the wafer is subjected during module processing. Examples include partial pressure of the process gasses, flux density, etc. Module settings are the values of the adjustable controls on the processing equipment used during processing. Examples of module settings include gas-flow rates, time, temperature etc. These abstraction levels are explored further in the related applications noted above.

Process Modules

A process module is a group of process steps, at varying levels of process complexity, that can be effectively observed, modeled and controlled. A module is modelable if one can construct a computational model of the wafer-state transformations that can be performed by the module. Observability implies that the values of the wafer-state parameters can be obtained by observation. Controllability implies that validity of module models can be ensured by either adjusting the processing equipment if required, or by adapting the module models. Effective modelability and controllability requires that the cost of modeling and controlling a module is not prohibitive.

Identifying sequences of process steps that can be grouped together to form modules useful for process design requires a trade-off in design flexibility and modeling difficulty. Keeping each individual process step as a separate module maximizes design flexibility because a large number of device types can be fabricated by using these modules in different combinations. However, use of modules at this granularity increases the difficulty of modeling the modules. To use each individual process as a separate building block, the interaction between the modules has to be characterized. This task can get quite complex depending on the accuracy of the characterization. At the other end of the spectrum, the complete fabrication sequence for a device can be considered to be one module. Though such a module captures all interactions, it offers little scope for reuse.

Module models describe how the incoming wafer-state is impacted. That is, the module models describe the transfer-functions mapping the incoming wafer-state to an outgoing wafer-state. The models should be amenable to tuning and re-calibration to preserve accuracy in face of drifts in the processing equipment. The requirement for possibly frequent re-calibration implies that the models should have a set of readily observable parameters that can be used for model tuning.

The wafer-state transformation at the module with index k can be expressed as:

$$W_{k+1}=F_k(W_k,P_k)$$

where, $W_k$, $W_{k+1}$ are the present and next wafer states, $P_k$ is the treatments/settings applied at the current module, $F_k$ is the function representing the wafer-state transformation performed by the module.

To perform process design at the module effects level one would like to have a description of the wafer-state transformations produced by a module, without having to specify the process treatments required to achieve those transformations. At a later stage, after the design at the module-effects level has been completed, one can go to the next lower level of abstraction and determine the process treatments required to produce the chosen wafer-state transformations. This procedure has the desirable feature of decoupling process design at the module effects level from the selection of process treatments required to achieve the module effects.

To achieve the separation between module effects and the corresponding process treatments, the module models are described as acceptability regions at the module effects level. Acceptability regions specify the set of outgoing wafer-states possible for an incoming wafer-state. In a sense one is "integrating" over all process treatments to determine the set of outgoing wafer-states possible for an incoming wafer-state. While representing functions is straight-forward, many-to-many mappings, like acceptability regions require special representations. Below a possible representation is described for the acceptability regions that has been used for prototyping in the synthesis approach, other representations exist and could also be used.

Acceptability Region Representation

A representation for acceptability regions requires a flexible description which is general enough to describe a large class of possible shapes. In addition, as described below, operations of intersection and projection are performed on these acceptability regions, so a representation that would not require complex algorithms for these operations is preferable. A look-up table based representation satisfies both of these requirements.

Figure 1B:
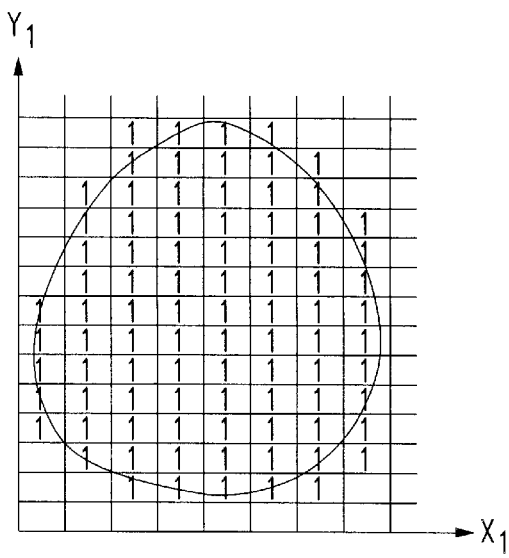

In this representation each parameter (axis) of the acceptability region is quantized into a finite number of divisions. The quantization of each parameter results in a set of "boxes" or grids in a multi-dimensional space. Each box is set to a 1 if there exists a process treatment that, for some value of incoming wafer state parameters contained in the box, produces outgoing wafer-state within the box. That is, the acceptability regions are indicator functions with a finite-domain, where each element of the domain corresponds to a quantization level for the incoming and outgoing wafer-state parameters. FIG. 1 illustrates this grid representation. FIG. 1a represents the original acceptability region, and FIG. 1b represents the gridded acceptability region.

The grid representation assumes that if any point in a box is acceptable then all points are acceptable. This assumption results in an approximation of the actual region. The impact of this representation during the design process can be limited by making the grid size small. The grid size could be chosen so that going from the lower limit to the upper limit on the grid does not change any wafer effect that causes a change in device designables that changes any device performance by more than a certain amount, such as 5%. The value of grid size could be determined by considering the linear sensitivities of the device performance to the designables and the needed tolerance on the control of the processes.

In an embodiment these regions are represented hierarchically to reduce the computational resources required for storing and operating on acceptability regions. A hierarchical representation is one where a set of adjacent points that all have the same value (either set or unset) may be represented by a single hierarchical grid point. The hierarchical representation provides data compression—fewer grids are needed to represent a given n-dimensional body. The hierarchical representation also makes boolean grid operations, such as intersection, more efficient than for a flat grid, since sets of adjacent points may be operated upon simultaneously. Grids and hierarchical grids are only a few of the methods for representing acceptability regions. Other representations can also be utilized for process synthesis and are considered to be within the scope of this patent. Translation between abstraction levels An advantage of the present invention is to reduce the cost and cycle time for developing microelectronic manufacturing processes by dividing the task into a number of reusable process modules and then translating the design requirements between those levels. This technique is referred to herein as process synthesis. Thus, a primary goal of process synthesis is to translate design requirements between abstraction levels. Translation between the first and second levels, device performance and device designables, and between the second and third levels, device designables and module effects, are discussed further below. The task of translating between the last three levels is the task of recipe synthesis. Recipe synthesis for individual processes has been explored in semiconductor manufacturing as a part of control-to-target approaches. Examples of these translations may also be found in the cross-referenced applications listed above.

The first translation is between the device performance and device designables. The first step in this translation is to define a set of device designables. The device designables may be identified from experience with the design parameters. For example, device designables for CMOS processes include parameters of the device such as gate oxide thickness, and the parameters that define the doping profiles. The parameterization of the device from design experience may be used in conjunction with a numerical device simulator to construct response surface models of device performance in terms of the device designables. When obtained from a computationally expensive simulator, these response surfaces serve as computationally efficient replacements for the simulator. Alternatively, these response surfaces can also be derived from measurements obtained from characterization experiments. in the preferred embodiment, the response surface models were constructed using design of experiments (DOE).

The models of device performance in terms of the designables are used to determine the linear sensitivity of the device performance to the designables. These sensitivities are used to quantize the space of designables. Performance constraints and targets are decomposed into an acceptability region in terms of the quantized device designables using the response surface models. This is performed by evaluating the model at the center point of each hyberbox in the designables space and checking whether the predicted performance meets all the device requirements.

Figure 2:
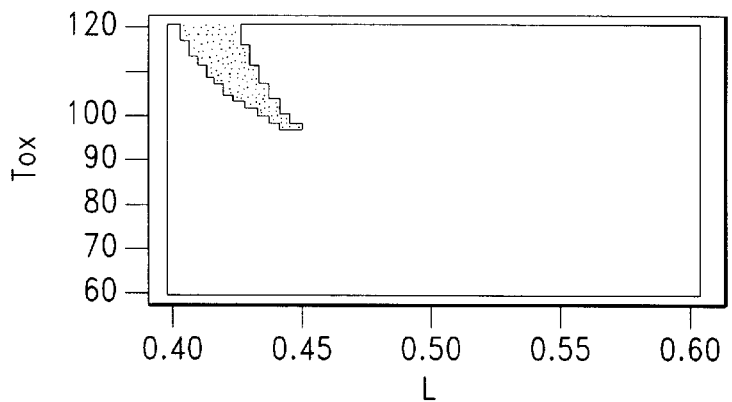
FIG. 2 shows an example of a two dimensional acceptability region for gate length and oxide thickness.

For example, FIG. 2 shows an example of the projection of an acceptability region in the space of two designables, gate length L and gate oxide thickness $T_{ox}$, derived using the decomposition algorithm. The interpretation of this acceptability region is that all points in the white region will achieve the device goals, and no point in the black region will do so. This procedure identifies all valid designs in the space of selected designables. This is an improvement over current practice, where a designer can only explore a small number of designs manually.

Deriving module effects from device designables

Figure 3:
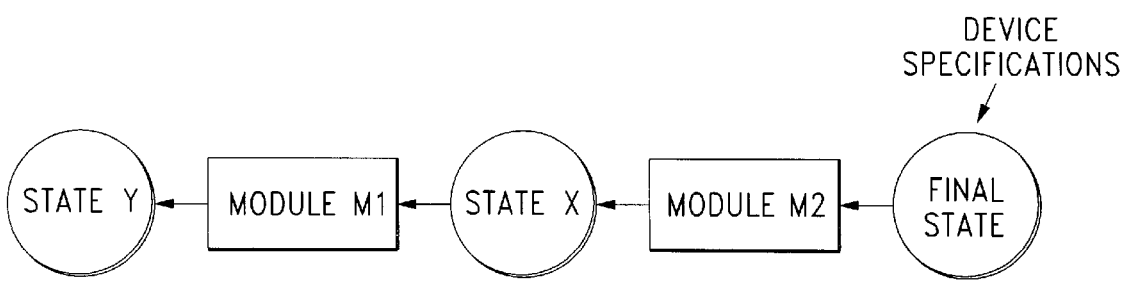
FIG. 3 illustrates an embodiment of the present invention where constraints of a module M2 are propagated to beginning state Y.

Next is the translation between the device designables level to the module effects level. The goal of this translation is to determine the acceptable ranges of wafer state parameters after each module in the flow, such that a given set of device designables may be achieved at the end of the flow. A flow may be described for the purpose of this invention as a sequence of process modules. Deriving module effects from device designables is accomplished by first translating device performance specifications to wafer-state specifications at the end of the flow. Then, as suggested in FIG. 3, the final wafer state constraints are propagated backwards through the last module in the flow (Module M2 in the figure), by intersecting the final wafer state specifications with the module's acceptability region model. This produces a region which describes the constraints on the wafer state before processing the last module (Wafer State X in the figure), such that the final specifications may be met. This derived region is then propagated backwards through the previous module in the flow (Module M1), to produce constraints on the wafer state before that module (Wafer State Y), and so on. The propagation process continues backwards through the flow, to generate successive constraints on the wafer state produced by each module in the flow, such that the final wafer state specifications or device designables may be achieved. The flow sequence thus forms a constraint graph, where the module models are constraints between wafer acceptability region parameters.

In a preferred embodiment, the module models—the acceptability regions—are used as the basis of flow design through constraint propagation. Typical prior art implementations use intentional operations on 1-D ranges to propagate interval constraints. Here, in contrast, constraints on the acceptability region's parameters may be multi-dimensional shapes themselves. Constraints are propagated through an acceptability region via region intersection. The result of the intersection is a new (more constrained) acceptability region, in the same hierarchical grid format, and of the same dimensionality (that is, it has the same input and output dimensions).

Figure 4A:
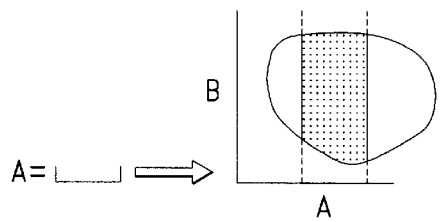
FIG. 4a illustrates propagation of constraints from a single dimensional constraint to a two dimensional module.

For example, consider the situation of FIG. 4. In FIG. 4a, a 1-D constraint on the range of parameter A is propagated through a simple 2-D module acceptability region. The constraint (the range on A) is propagated by intersection with the module acceptability region. As the result of intersection, it is known that any value of parameter B compatible with the constraint, must lie within the shaded result region. It can also be seen that for different values of A within the constraint range, different resulting ranges for B are produced.

Figure 4B:
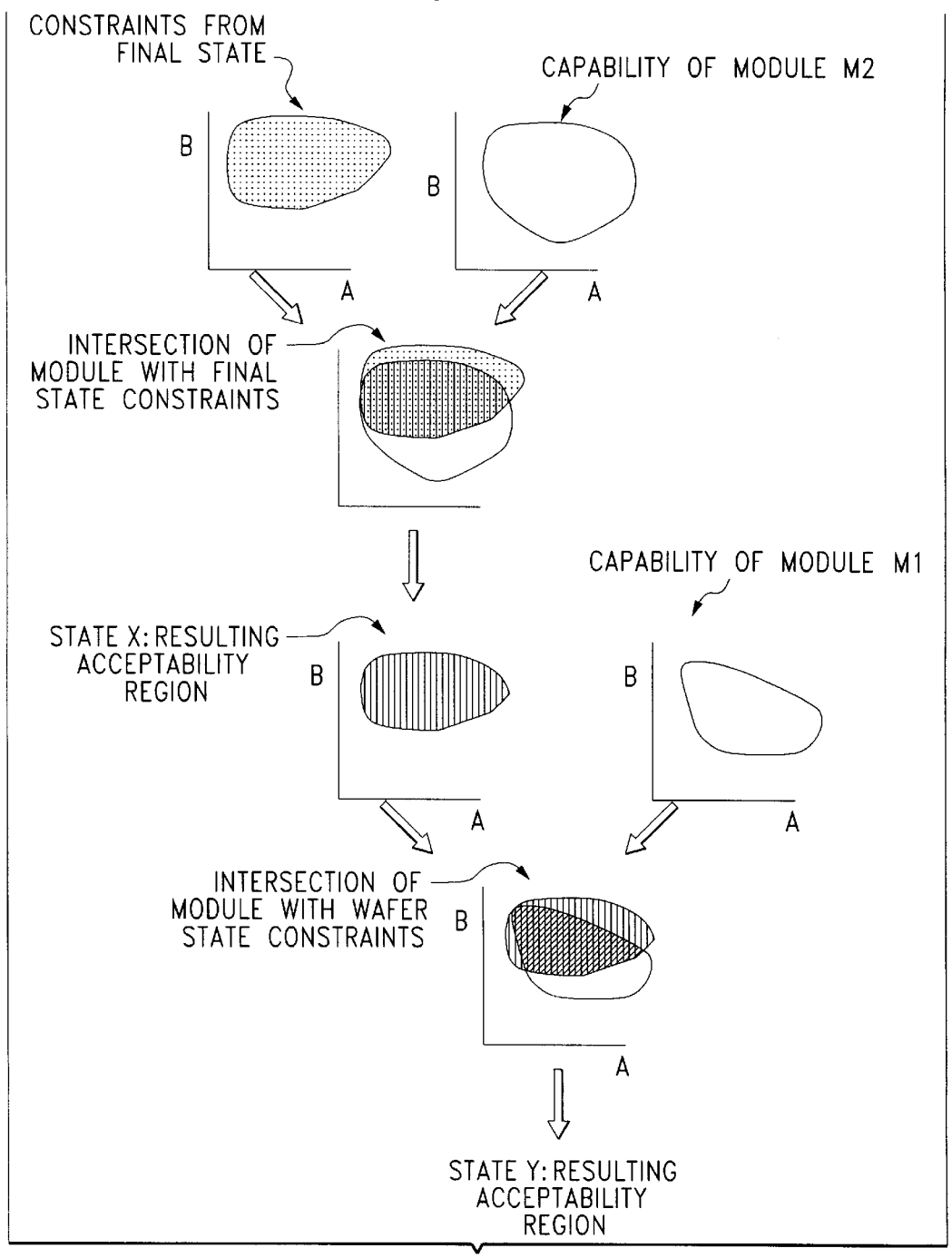
FIG. 4b illustrates propagation of two dimensional constraints to a two dimensional module.

In contrast, in FIG. 4b, a 2-D constraint on the range of parameter A and B is propagated through a simple 2-D module acceptability region. The constraint (the range on A and B) is propagated by intersection with the module acceptability region. As the result of intersection, it is known that any value of parameter A and B compatible with the constraint, must lie within the double shaded result region. Thus, FIG. 4b shows the final wafer state constraints propagated backwards through the last module in the flow (Module M2 in FIG. 3) producing a region which describes the constraints on the wafer state before processing the last module (Wafer State X in the FIG. 3), such that the final specifications may be met. This derived region is then propagated backwards through the previous module in the flow (Module M1), to produce constraints on the wafer state before that module (Wafer State A in FIG. 3), and so on. In this manner the propagation process continues backwards through the flow, to generate successive constraints on the wafer state produced by each module in the flow, such that the final wafer state specifications or device designables may be achieved.

The figures discussed above also illustrate another point: as far as the constraint propagation algorithm is concerned, there is no distinction between model "inputs" and "outputs". Constraints on any model parameter may constrain the other parameters, regardless of their "input" or "output" status.

If at any time the intersection of wafer state constraints with a module's model produces a null region, this means that the module—as defined by its underlying settings-to-effects models—is not capable of producing the required wafer state effects given any settings. In this case, a different module must be substituted in the flow. If no appropriate substitutions are available, the device specifications are not achievable without new module development.

As described above, for each module in the flow, constraints on a module's output effects are propagated backwards through the module's acceptability regions to produce constraints (new acceptability regions) on the state prior to the module. These derived constraints are then used as constraints on the previous module's output effects, and so on. So, e.g., for Module M1 of FIG. 3, its acceptability region is intersected with the acceptability region constraint (of State X) generated from propagation backwards through Module M2. This derived constraint region will be of the dimensionality as the module from which it was produced. So, the result of propagating the final state constraints backwards through Module M2 will produce a constraint region—in State X—of the same dimensionality as M2's model. This constraint now must be propagated backwards through module M1. Because Module M1 may not have the same parameter dimensionality as M2—that is, may not have the same inputs and outputs—the constraint region of State X must be projected onto M1's dimension space so that it can be utilized. That is, a projection is created of only those dimensions in State X's acceptability region required by M1's acceptability region.

FIG. 5 shows this process for an example in which only one of the parameter dimensions in State X's acceptability region needs to be projected onto M1's space. Here, the projection of values for parameter A is calculated, and used as a constraint on M1's acceptability region—the result of the intersection includes only those grid points which contain a value for the A dimension between the constraining range. Parameter B was not included in this projection since it was not used in M1's model. Alternatively, M1 might include both parameters A and B, as was shown in FIG. 4b. In this case, a 2-D projection of values for parameters A and B would be created from the region in State X (in this case, with a 2-D region, the 2-D projection is equivalent to the region). Then, the 2-D projection could be used as the constraint on Module M1. As suggested by the figure, the result of the intersection includes only those grid points whose values in the A and B dimensions fall within the constraining region.

The discussion up to this point has been limited to backwards propagation of constraints, ie. constraints from process module M2 to Module M1. in some processes, an earlier process may have a constraint on a later process which is not taken in consideration by the methods described above. For example, this will occur where a later process has a parameter which is limited by a parameter of an earlier process that is not shared with the later process. To take in consideration these additional constraints, forward propagation of constraints may be done subsequent to backwards propagation in the same manner as for backwards propagation.

An additional advantage of the present invention, is the visualization capability when the existing modules are unable to produce the desired device. In these situations, by viewing the acceptability regions at different stages of propagation, the designer can identify candidate modules that need to have expanded capability, or the device performances that need to be relaxed in order to be able to use the current modules.

Computer Software Embodiment

An embodiment of the invention was developed for process synthesis of Application Specific Integrated circuits. Processing in this embodiment was limited to the process modules up to but not including making contacts and interconnects. The embodiment is a system called the Integrated Design Environment (ODE). The IDE was developed on a Sun SPARC station and runs under X-windows. The IDE was written in a combination of C++, and Tcl/Tk. Tcl is an interpreted language designed for rapid prototyping and Tk is a set of Tcl functions that make the design of X-window based user interfaces extremely easy to prototype.

Process Modules and Acceptability Regions

The Process Modules from existing processing technology are stored in Process Module Libraries. These libraries store information about each module and models to allow wafer state transformations as well as models to allow recipe generation for the selected effects points of each module. The wafer state transformation models for each module are large acceptability regions that can be intersected with the acceptability regions in each wafer state to perform either backward or forward propagation. Since each acceptability region must represent a region in N-dimensional space where any value is an acceptable design, the problem of efficient representation is non-trivial. The acceptability region is represented in this embodiment using a hierarchical grid approach.

System Organization

When started, the IDE creates a tool bar with four options: Design Manager, Process View, Device View, and Exit. The Current Design is displayed in the window above the four option buttons. To utilize the IDE, the designer first enters the design manager to create a new design or open an existing one. Then the designer uses the Device View to specify performances and create an acceptability region for designables. The designer then uses Process View to determine the specific module effects for each process. Exit has an obvious function.

Design Manager

The Design Manager is used to open existing designs, delete existing designs, and create new designs. A new design is created with all designables fixed and no constraints on performances.

Device View

After a new design has been created or an existing design opened, the designer should select Device View from the IDE tool bar.

The main screen of the device view may be divided into two main areas, Device Performances, FIG. 6a and Device Designables, FIG. 6b. The Device Performances area contains a list of all device performances that the designer can specify. Each performance has a status: active or inactive. To set the status of any performance, double click on the performance to get the screen in FIG. 6c.

The status of the performance can be specified. If the performances is set to active, then the user can specify a box constraint on the allowable values of the performance. By setting box constraints on any number of performances, the designer creates the initial acceptability region for the device performances of his device. In FIG 6a, the designer has activated three performances. Their display on the main screen is updated to display this fact. In this case, FOM1 (a figure of merit for CMOS technology), PDIoff (off current of the PMOS device) and NDIoff (off current of the NMOS device) are made active and constraints are specified.

The Device Designables area, see FIG 6b, contains a list of all device designables available to the designer. Each designable is in one of three states that is determined by the user: Nominal, Fixed, or Variable. To modify the state of any designable, double click on the designable to get the screen in FIG. 6d. From this screen, the user can choose the designable type (or status). If the designable is chosen to be variable, the designer can specify constraint values to limit the acceptability region of the designable and a design point that will be used in analysis (Calculate Performances). If the designable is chosen to be fixed, the designable will be fixed to the design point in any designable acceptability region. If the designable is set to be nominal, then the designable will be held to the nominal value.

The information displayed for each designable is determined by its state set by the user. In FIG. 6e, Ppt-char is fixed to the nominal value for this flow. Therefore, the only information displayed for it is the nominal value. Pvtpeak has been set to a fixed value by the designer. (In this case, the value is equal to the nominal value; however, it could be any value within the constraint.) For Pvtpeak, the fixed status is displayed, the nominal value is displayed, the fixed point (chosen by the designer) is displayed, and the min and max constraints are displayed. The third designable, Tox (thickness of the gate oxide), is set to be Variable. Variable designables are the ones for which acceptability regions are generated.

Device Decomposition and Performance Calculation

Figure 6F:
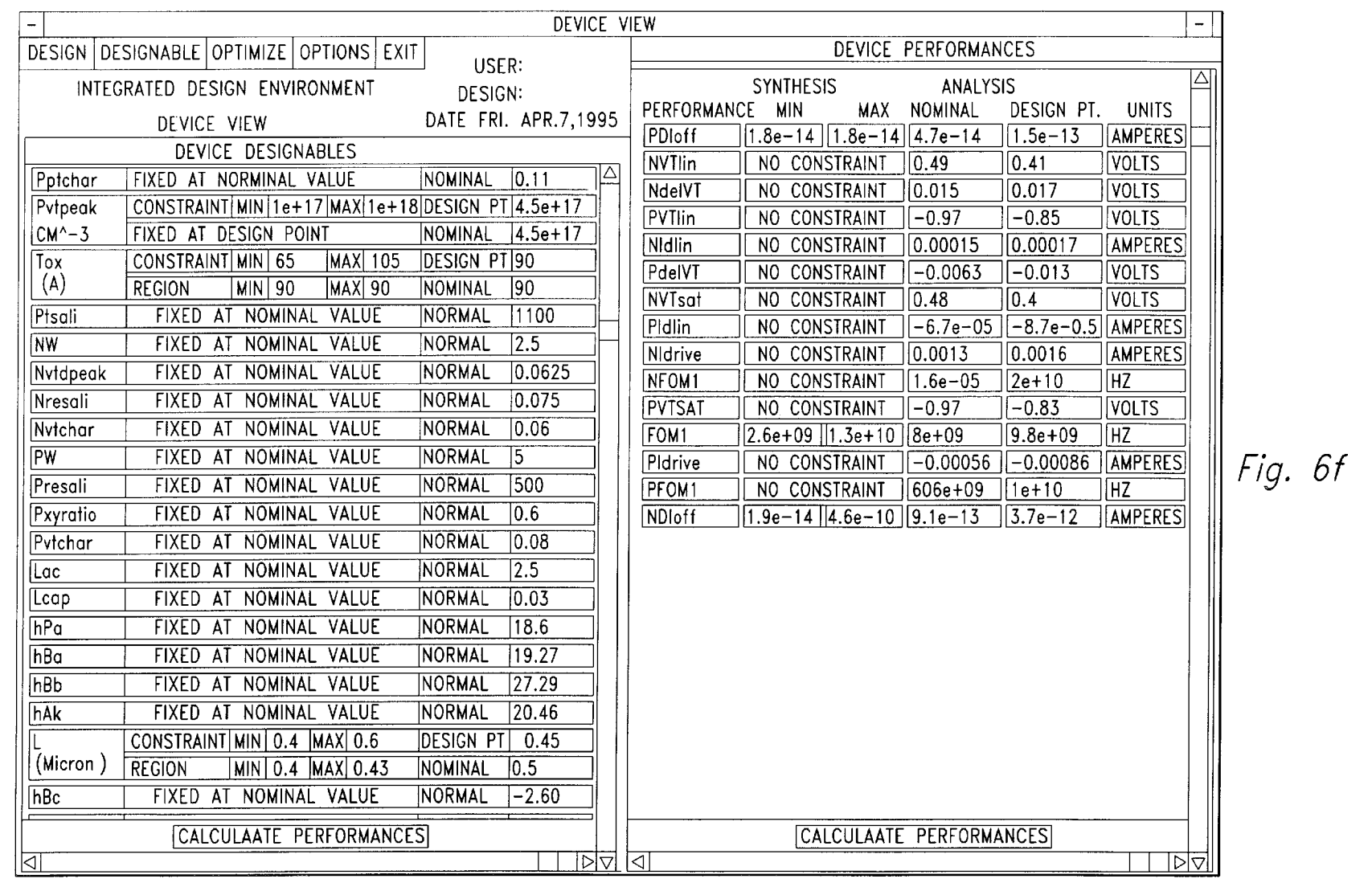

There are two action buttons defined on the bottom of the device view screen. These are "Calculate Performances" and "Decompose Designables". When Calculate Performances are selected, the nominal values of each designable are used to calculate the nominal values of each performance and the design points (nominal value if no design point specified) of each designable are used to calculate the design point for each performance. An example of how this changes the display is shown in FIG. 6f. In this example, the design points of Tox and L were modified away from their nominal values (Tox=80A, L=0.45 microns). These modifications affected nearly all performances. Consider three of them. The values of PDIoff, NDIoff, and FOM1 all increase. If the designer were willing to pay a penalty in PDIoff and NDIoff, a 22% increase in FOM1 could be achieved. Assume that the designer wanted to achieve a 15% increase in FOM1 but wanted to keep NDIoff below 1e-12. Is this design possible? The first step is to set constraints on FOM1 and NDIoff and then select "Decompose Designables" to determine if any acceptability region exists. The results of this are shown in FIG. 6f. In this case, a region was successfully found. The minimum and maximum values of each Variable designable in the region are displayed under the device designables (91←Tox←101,0.4←L←043). Since this region is probably not rectangular, every combination of Tox and L between these values would probably not be realizable; however, for each value of Tox there exists at least realizable L value and vice versa.

Device View Output

To output the acceptability region for the device designables, the user must select "Design/Save" from the device view's menu.

Process View

Figure 6G:
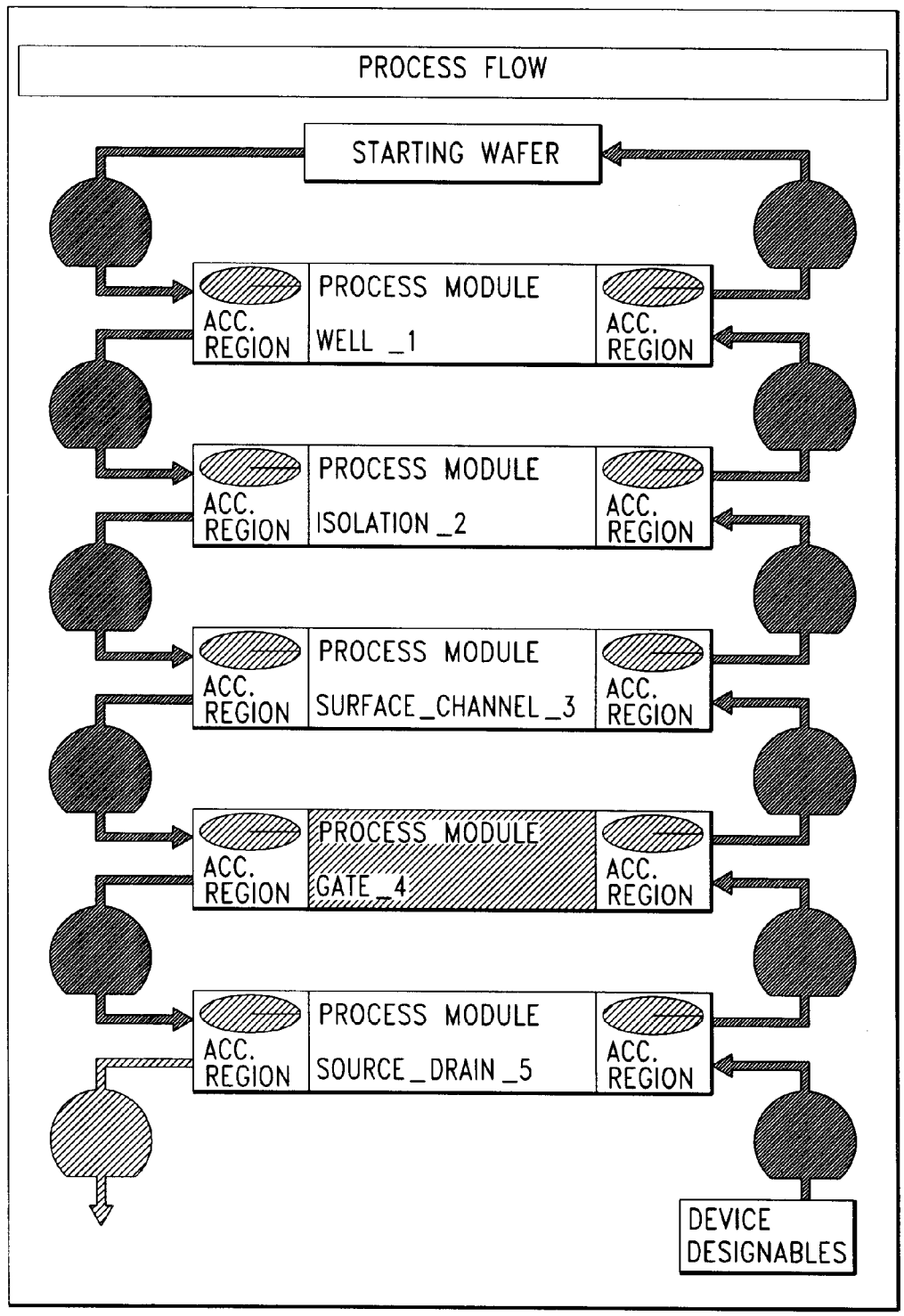

After the designer has saved his design, he can enter the process view to determine the wafer state affects required from each module (see FIG. 6g). This screen may contain 3 areas: Cross Section, Module Information, and Process Flow. The process flow area contains boxes to represent the process flow, wafers to represent the wafer states needed during backward (on the right) and forward (on the left) propagation, and arrows to indicate the direction of propagation. The cross section screen area contains a graphical view of the selected wafer state. Initially, this is blank since backward and forward propagation are used to create the wafer state. The final region is the module information screen area. This area contains information about the selected module.

Process Modules

Each module in the process flow is indicated with a box in the process flow area. Selecting this box displays process information in the module information area. This information, as well as the acceptability regions needed for propagation through the module are drawn from the module library.

Backward Propagation

Figure 6H:
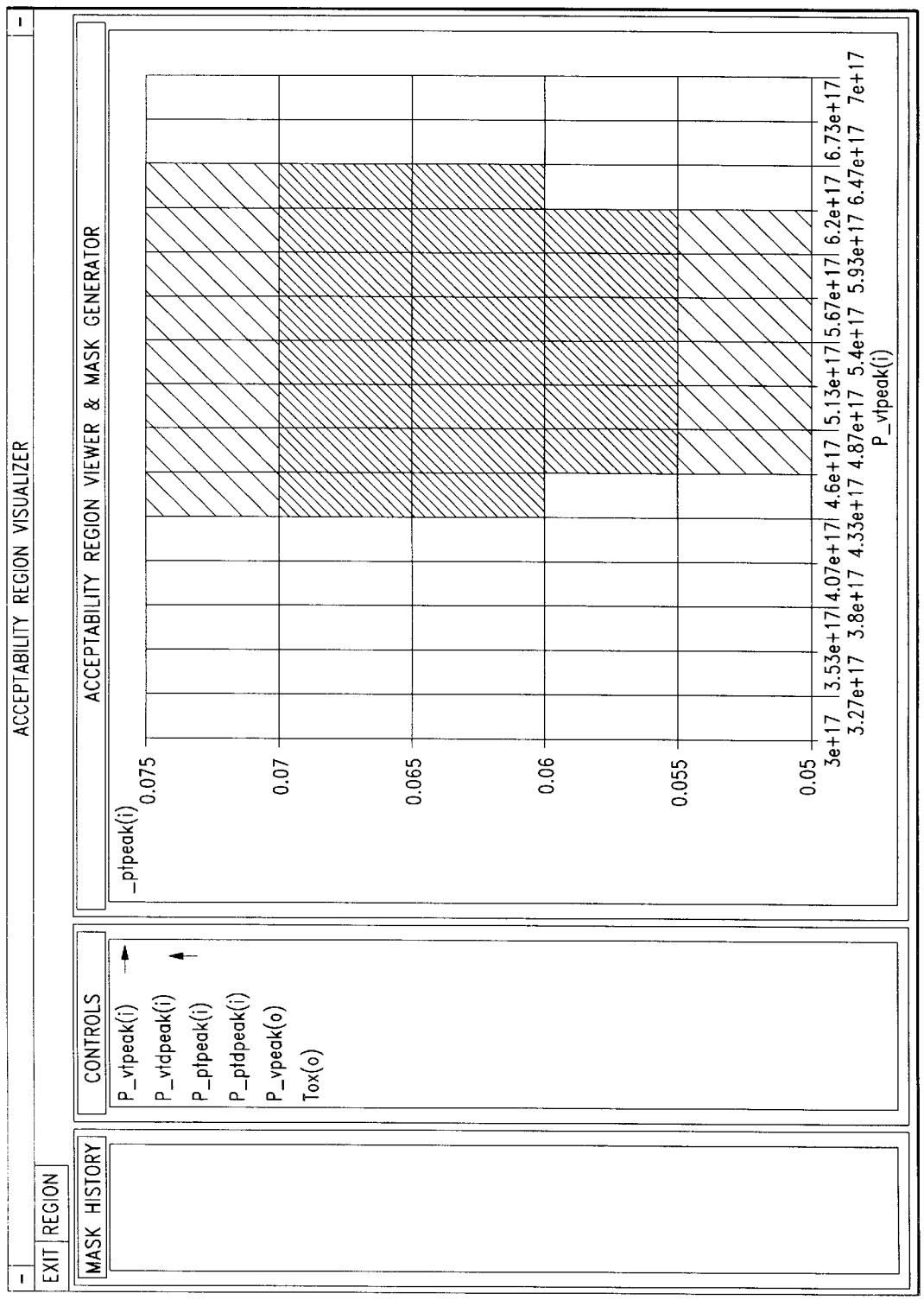

Backward propagation starts with the designables acceptability region and intersects the region after each module with the acceptability region of each module to determine the acceptability region of the wafer state before each module. When the propagation through a module is complete, the incoming wafer state is changed from gray to black. To initiate backward propagation, double click on one of the wafer states and select "Propagate Acceptability Region" from the pop-up menu. if the top wafer on the right of the process flow area is propagated to, then backward propagation is completed. Any of these backward wafers can be selected to view the wafer state in the cross section area (FIG. 6h). To view the acceptability regions at any wafer state double click on the wafer state and choose "View Acceptability Region" from the pop-up menu. After this, a pop-up menu is created for each of the acceptability regions maintained in the wafer state. (Although there is conceptually only one region for each wafer state, multiple regions simplify both modeling an representation). When one of those regions is chosen, a visualizer (FIG. 6h) is initialized. This visualizer allows the user to view any two dimensional projection of the acceptability regions. To aid in setting module effects, the user can set any point in the two dimensional projection to be unacceptable and can then visualize the effect of that decision. In FIG. 6h, each black or gray square represents a grid point that was acceptable in the acceptability region maintained by the wafer state. To study the region, the designer has selected some of the grid points and marked them as unacceptable. He can now view the effect of this on other projections. This gives the designer powerful insight into the region that can be used for setting module affects parameters.

Forward Propagation

Forward Propagation is the next step in utilizing the Process View. During forward propagation, the acceptability region of the incoming wafer is intersected with the acceptability region of the module and constraints from backward propagation to produce the acceptability region for the wafer state after the module. When forward propagation has been completed all of the way through the source/drain module (FIGS. 6g) the resulting wafer state contains the acceptability region that specifies the realizable designables. These realizable designables will be a subset of the device designables region created from the Device View.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. it is therefore intended that the appended claims encompass any such modifications or embodiments.

What is claimed is:

1. A method for designing a manufacturing process flow for a manufacturable device comprising the steps of:
   a. partitioning of said manufacturing process flow into a number of abstraction levels having at least a device performance level for describing device performance specifications, a device designables level having device state specifications for describing features of a device that can be modified to obtain the desired performance, and a module effects level;
   b. translating device performance specifications from the device performance level to device state specifications at the device designables level;
   c. translating between the device designables level and the module effects level by a sequence comprising the steps of:
      i. identifying sequences of processes that can be grouped together to form at least two modules where each module of processes has outgoing device states and incoming device states, and where at least two modules is a sequence of modules which has at least a first module and a final module;
      ii. describing module models for each module as acceptability regions of constraints at the module effects level of abstraction which specify the set of said outgoing device states possible for said incoming device states; and
      iii. propagating constraints of said final module backwards toward said first module by intersecigng said final module constraints with successively earlier module constraints in said sequence of modules.

2. The method according to claim 1, further comprising the step of propagating constraints of said first module forward said last module by intersecting said first module constraints with successively later module constraints in said sequence of modules.

3. The method according to claim 1, wherein said acceptability regions are represented by a grid in a multi-dimensional space having a value in a box or intersection for each space in said grid.

4. The method according to claim 1, wherein said acceptability regions are represented hierarchically.

5. The method according to claim 1, wherein said device is a semiconductor microelectronic device.

6. A method for designing a semiconductor manufacturing process flow for a manufacturable device comprising the steps of:
   a. partitioning of said semiconductor manufacturing process flow into a number of abstraction levels having at least a device performance level for describing device performance specifications, a device designables level having device state specifications for describing features of a device that can be modified to obtain the desired performance, and a module effects level;
   b. translating device performance specifications from the device performance level to device state specifications at the device designables level;
   c. translating between said device designables level and said module effects level by a sequence comprising the steps of:
      i. identifying sequences of processes that can be grouped together to form at least two modules where each module of processes has outgoing wafer states and incoming wafer states, and where at least two modules is a sequence of modules which has at least a first module and a final module;
      ii. describing module models for each module as acceptability regions of constraints at the module effects level of abstraction which specify the set of said outgoing wafer states possible for said incoming wafer states; and
      iii. propagating constraints of said final module backwards toward said first module by intersecting said final module constraints with successively earlier module constraints in said sequence of modules.

7. The method according to claim 6, further comprising the step of propagating constraints of said first module forward toward said last module by intersecting said first module constraints with successively later module constraints in said sequence of modules.

8. The method according to claim 6, wherein said acceptability regions are represented by a grid in a multi-dimensional space having a value in a box or intersection for each space in said grid.

9. The method according to claim 6, wherein said acceptability regions are represented hierarchically.

10. A computer system for designing a semiconductor manufacturing process flow for a semiconductor device comprising the steps of:

a. means for partitioning of said semiconductor manufacturing process flow into a number of abstraction levels having at least a device performance level for describing device performance specifications, a device designables level having device state specifications for describing features of a device that can be modified to obtain the desired performance, and a module effects level;

b. means for translating device performance specifications from the device performance level to device state specifications at the device designables level, while allowing the user to select specific device performance constraints in said device performance level;

c. means for translating between said device designables level and said module effects level by a sequence comprising the steps of:

i. identifying sequences of processes that can be grouped together to form at least two modules where each module of processes has outgoing wafer states and incoming wafer states, and where at least two modules is a sequence of modules which has at least a first module and a final module;

ii. describing module models for each module as acceptability regions of constraints at the module effects level of abstraction which specify the set of said outgoing wafer states possible for said incoming wafer states; and iii. propagating constraints of said final module backwards toward said first module by intersecting said final module constraints with successively earlier module constraints in said sequence of modules.

11. The computer system of claim 10, further comprising means for propagating constraints of said first module forward toward said last module by intersecting said first module constraints with successively later module constraints in said sequence of modules.

12. the computer system of claim 10, wherein said acceptability regions are represented by a grid in a multi-dimensional space having a value in a box or intersection for each space in said grid.

13. The computer system of claim 10, wherein said acceptability regions are represented hierarchically.

* * * * *